United States Patent [19]

Takayama et al.

[11] Patent Number: 5,663,842
[45] Date of Patent: Sep. 2, 1997

[54] SURFACE WAVE MOTOR BUILT-IN LENS BARREL

[75] Inventors: Tooru Takayama, Kumagaya; Tsuneo Watanabe, Tokyo, both of Japan

[73] Assignee: Nikon Corporation, Tokyo, Japan

[21] Appl. No.: 640,440

[22] Filed: Apr. 30, 1996

[30] Foreign Application Priority Data

Jul. 14, 1995 [JP] Japan .................................. 7-178391

[51] Int. Cl.$^6$ ................................ G02B 7/02; G02B 15/14
[52] U.S. Cl. ........................ 359/823; 359/825; 359/824; 359/696; 359/698
[58] Field of Search ....................... 359/823, 824, 359/825, 696, 697, 698; 396/133, 137, 75

[56] References Cited

U.S. PATENT DOCUMENTS 5,239,415  8/1993  Imanari et al. .................... 359/694
5,526,188  6/1996  Kanno et al. ..................... 359/698

Primary Examiner—Georgia Y. Epps
Assistant Examiner—John P. Cornely

[57] ABSTRACT

A surface wave motor built-in lens barrel has a manual focus adjusting mode and an autofocus adjusting mode. The lens barrel comprises a photographing optical system, a fixed drum, a surface wave motor so fitted to the fixed drum as to be rotatable about an optical axis and having a fixed member capable of generating surface waves and a moving member friction-contacting the fixed member, rotating about the optical axis by the surface waves and thereby capable of moving the photographing optical system and a manual operation member capable of moving the photographing optical system by an outside operation. The photographing optical system is, in the manual focus adjusting mode, moved when the moving member and the fixed member of the surface wave motor become integral and rotated interlocking with a manual operation of the manual operation member. The photographing optical system is also, in the autofocus adjusting mode, moved when the fixed member of the surface wave motor is fixed to the fixed lens barrel while the moving member rotates. The fixed member of the surface wave motor has a distortion preventive member for preventing the distortion from being transferred to the portion where the surface waves are produced, the distortion being caused in a portion receiving a transfer of a force from the manual operation member.

2 Claims, 4 Drawing Sheets

SURFACE WAVE MOTOR BUILT-IN LENS BARREL

BACKGROUND OF THE INVENTION

1. Field of the Invention

The present invention relates to a surface wave motor built-in lens barrel for moving a photographing lens by use of a surface wave motor.

2. Related Background Art

This type of known surface wave motor built-in lens barrel has hitherto been constructed such that a manual operation member and a fixed member of a surface wave motor are so integrally connected as to be rotatable with respect to a fixed drum, and a mode selecting member involves the use of only an electric switch.

In this lens barrel, when a manual focus adjusting mode is selected by a mode selecting member, the moving member and the fixed member of the surface wave motor become integral and are rotated interlocking with a manual operation of the manual operation member, thereby moving a photographing optical system. Further, when an autofocus adjusting mode is selected, the fixed member is fixed to the fixed drum, and the photographing optical system is moved with a rotation of the moving member.

With this construction, the photographing optical system can be moved without damaging a contact surface between the moving member and the fixed member of the surface wave motor in the manual focus adjusting mode.

FIG. 2 is a sectional view illustrating a prior art example (e.g., Japanese Patent Application Laid-Open No. 4-343310) of the surface wave motor built-in lens barrel. FIG. 3 is a cross-sectional view illustrating a power supply portion in FIG. 2. FIG. 4 is a schematic block diagram of the lens barrel in the prior art example.

FIG. 2 shows a state of the autofocus adjusting mode in which focus adjusting optical systems L2, L3 are moved by a rotating force of the surface wave motor. In this state, a mode changeover switch 20 is set in the autofocus adjusting mode.

The focus adjusting optical systems L2, L3 are held by the lens holding drum 2 and moved in the optical-axis direction, thus adjusting a focal point. The lens holding drum 2 is so fitted to an inner periphery of a central intermediate-diameter portion 1a of the fixed drum 1 as to be movable in the optical-axis direction. A pin 3 is embedded in an outer peripheral part of the lens holding drum 2 and penetrates a guide groove parallel to the optical axis, which is formed in the central intermediate-diameter portion 1a of the fixed drum 1. The tip of the pin 3 engages with a cam groove 4a formed in an inner peripheral surface of a cam ring 4.

The cam ring 4 is fitted to an outer peripheral part of the central intermediate-diameter portion 1a of the fixed drum 1, and a pin 5 embedded in the outer peripheral part of the central intermediate-diameter portion 1a engages with a circumferential groove formed in the inner peripheral surface of the cam ring 4. Hence, the cam ring 4 is unmovable in the optical-axis direction but rotatable through only a predetermined angle about the optical axis. Further, a distance scale is indicated on a rightward large-diameter outer peripheral portion 4c of the cam ring 4.

A fixing member 6 of a surface wave motor is so attached to the outer peripheral part of the central small-diameter portion 1c of the fixed drum 1 as to be rotatable about the optical axis. A window member 8 is formed in the large-diameter portion 1d of the fixed drum 1 and is formed of a transparent synthetic resin. It is possible to read the distance scale indicated on the rightward large-diameter outer peripheral portion 4c of the cam ring 4 through this window member 8 as well as through an intermediate ring 7 formed of the transparent synthetic resin.

A rotator 9 comes into frictional contact with the fixing member 6 and is so provided as to be rotatable with respect to the fixing member 6 through a bearing 12. An engagement groove 9a is formed in a left part of the rotator 9 and engages with an engagement protrusion 4d provided on a rightward large-diameter inner peripheral part of the cam ring 4. Therefore, the rotator 9 and the cam ring 4 rotate integrally in the rotating direction. Further, a biasing member 14 causes the fixing member 6 and the rotator 9 to come into frictional contact with each other through a disk 13.

A manual operation ring 10 is fitted respectively to the leftward large-diameter portion 1e and the large-diameter portion 1d of the fixed drum 1. The intermediate ring 7 composed of the transparent synthetic resin is rotatably provided along the inner peripheral part of the manual operation ring 10.

A glass epoxy plate 15 is fixed to the fixing member 6 and includes, as illustrated in FIG. 3, a conductor portion 15a extending over the entire periphery of the ring. With this arrangement, even when a brush 16 slides on the conductor portion 15a and the fixing member 6 is in any angular position, an electrical connection to the fixing member 6 can be attained. Note that the glass epoxy plate 15 is formed with a through-hole 15b in an offset position from a ring-like portion. The conductor portion 15a conducts to a conductor portion provided on the rear surface of the glass epoxy plate 15 and electrically connected to the fixing member 6 from this rear surface.

A presser plate 17 is a plate for fixing the brush 16 to a brush fixing plate 18. The brush fixing plate 18 is fixed to the fixed drum 1 with a small screw 19.

A mode changeover switch 20 is slidably provided on the fixed drum 1 is set in a manual focus adjusting mode when slid in a direction M in FIG. 2 but in an autofocus adjusting mode when slid in a direction A. Further, the mode changeover switch 20 is constructed to generate electric signals corresponding to the respective modes.

A changeover plate 21 is fixed to a mode changeover switch with a small screw 23. A plate spring 22 is fixed to the fixed drum 1 with a small screw 24. The plate spring 22 is possible of engaging with and disengaging from a plurality of engagement grooves 6a formed in the outer peripheral part of the fixing member 6.

When the mode changeover switch 20 is slid in the direction M, that is, when in the manual focus adjusting mode, the changeover plate 21 simultaneously moves, and the plate spring 22 is pushed up as indicated by a dotted line in FIG. 2, thus making the plate spring 22 separate from the engagement grooves 6a. In a state where the plate spring 22 disengages from the engagement grooves 6a of the fixing member 6, the manual operation ring 10 is rotatable.

When the mode changeover switch 20 slides in the direction A, that is when changed over to autofocus adjusting mode from the manual focus adjusting mode, the changeover plate 21 simultaneously moves, and the plate spring 22 is, as indicated by a solid line in FIG. 1, returned to an initial state. Then, the plate spring 22 engages with the engagement grooves 6a of the fixing member 6, thereby hindering the rotation of the manual operation ring 10.

Note that there is to be satisfied such a condition as C<B<A, where A is a frictional torque of between the fixing member 6 and the rotator 9, B is a frictional torque between the fixed drum 1 and the fixing member 6, and C is a torque required for driving the lens holding drum 2.

(Explanation of Autofocus Adjusting Mode)

Next, the operation of the prior art lens barrel will be explained with reference to FIG. 2.

When in the autofocus adjusting mode, the mode changeover switch 20 is in a position A and, as indicated by the solid line in FIG. 2, the plate spring 22 engages with the engagement grooves 6a of the fixing member 6. Hence, the rotation of the manual operation ring 10 is hindered, and the fixing member 6 is also in an impossible-of-rotation state.

Herein, when the surface wave motor is supplied with the electricity from an unillustrated control mechanism (corresponding to a power supply in FIG. 4), surface traveling waves are produced on the fixing member 6, and the rotator 9 rotates in the circumferential direction. When the rotator 9 rotates, the engagement protrusion 4d provided on the cam ring 4 engages with the engagement groove 9a formed in the left part of the rotator 9, and consequently the rotator 9 and the cam ring 4 integrally rotate. Then, when the cam ring 4 rotates, the lens holding drum 2 moves along the optical axis, thus performing the autofocus adjustment.

(Explanation of Manual Focus Adjustment)

When in the manual focus adjustment mode, the mode changeover switch 20 is slid in the direction M in FIG. 2. The supply of the electricity to the surface wave motor is thereby cut off.

When the mode changeover switch 20 is slid in the direction M, the changeover plate 21 fixed to the mode changeover switch 20 also simultaneously moves, and the plate spring 22 fixed to the fixed drum 1 is pushed up and consequently disengaged from the engagement groove 6a formed in the outer peripheral part of the fixing member 6.

In a state where the plate spring 22 disengages from the engagement groove 6a, the manual operation ring 10 is rotatable, and, besides, since the supply of the electricity to the surface wave motor is cut off, the surface wave motor can not be driven. The fixing member 6 and the rotator 9 are in such a state that these two members are strongly pressed by the biasing member 14.

Further, there is met such a condition as C<A, where the A is the frictional torque between the fixing member 6 and the rotator 9, and the C is the torque needed for driving the lens holding drum 2. Hence, when rotating the manual operation ring 10, the fixing member 6 and the rotator 9 integrally rotate through the intermediate ring 7.

When the rotator 9 is rotated, the engagement protrusion 4d provided on the cam ring 4 engages with the engagement groove 9a formed in the left edge part of the rotator 9, and, therefore, the rotator 9 and the cam ring 4 integrally rotate. When the cam ring 4 rotates, the lens holding drum 2 moves in the optical-axis direction, thereby performing the manual focus adjustment.

According to the prior art example, when in the autofocus adjustment mode, the mode changeover switch 20 is in the position A, and, as illustrated in FIG. 2, the plate spring 22 engages with the engagement groove 6a formed in the outer peripheral part of the fixing member 6. Consequently, the manual operation ring 10 is hindered from rotating, and the fixing member is also in the impossible-of-rotation state.

Even when the plate spring 22 does not engage with the engagement groove 6a, however, there is satisfied such a condition as C<B, where the B is the frictional torque between the fixed drum 1 and the fixing member 6, and C is the torque necessary for driving the lens holding drum 2. Hence, not the fixing member 6 but only the rotator 9 rotates.

That is, the mode can be simply changed over to the autofocus adjustment mode and the manual focus adjustment mode, depending on whether or not the surface wave motor is supplied with the electricity.

Accordingly, there is no necessity for the mechanical changeover when performing a go-home photographing function of memorizing an arbitrary photographing distance beforehand and, after taking a shot at another photographing distance, moving the lens to the memorized photographing distance and also a manual focus adjustment mode priority photography of instantaneously changing over the mode to the manual focus adjustment mode by rotating the manual operation ring during the photography in the autofocus adjustment mode. Hence, it is quite easy to incorporate the mechanism for quickly performing the above function and changing over the mode.

The above-mentioned surface wave motor has such an aspect that characteristics of the number of rotations and the output torque of the moving member are substantially determined by a size or a shape of the motor. For example, if the torque required for moving the photographing optical system is determined, the number of rotations is automatically determined. Accordingly, if a time needed for the photographing optical system to move from a photographing distance ∞ position to a closest position is determined, it follows that there is automatically determined an angle necessary for the moving member to rotate from the photographing distance ∞ position to the closest position.

In the above-described conventional lens barrel, however, when selecting the manual focus adjustment mode, the fixed member and the moving member of the surface wave motor become integral and rotate interlocking with the manual operation of the manual operation member, thus moving the photographing optical system, resulting in a determination of the angle needed for the rotation of the manual operation member from the photographing distance ∞ position to the closest position. Accordingly, if this angle is too small to make the manual focus adjustment, there arises such a problem that the manual focus micro-adjustment is impossible.

Under such circumstances, for the purpose of obviating the above problem, the present applicant proposed a surface wave motor built-in lens barrel disclosed in Japanese Patent Application No. 6-249224, which is capable of performing the manual focus micro-adjustment by setting the angle needed for the rotation of the manual operation member from the photographing distance ∞ position to the closest position larger than an angle of rotation of the moving member of the surface wave motor.

More specifically, the lens barrel includes an angle-of-rotation enlarging device constructed of a plurality of rollers rotatably provided at a part of the fixing member and rotating on the side surface of the fixed drum and a biasing member for bringing the manual operation ring into the frictional contact with the inner peripheral surface of the fixed drum through the rollers by pressing it against that inner peripheral surface. A ratio of an angle of rotation of the manual operation ring to that of the fixing member is enlarged to 2:1.

In the above-mentioned conventional lens barrel and the lens barrel disposed in Japanese Patent Application No. 6-249224, however, the rotary force applied on the manual operation ring in the manual focus adjusting mode is transferred directly to the fixing member via the intermediate ring 7 (and the angle-of-rotation enlarging device). Consequently, the fixing member elastically deforms, and this deformation extends up to a contact surface with the rotator. Herein, the surface wave motor drives the rotator by use of traveling waves having an amplitude on the order of 1 μm that are generated by the fixing member. Accordingly, there exists a problem in which a slight deformation on the contact surface between the fixing member and the rotator might be a cause of decreasing an electromechanical energy conversion efficiency of the surface wave motor.

SUMMARY OF THE INVENTION

It is a primary object to provide a surface wave motor built-in lens barrel exerting no influence on an electromechanical energy conversion efficiency of a surface wave motor even if a fixing member elastically deforms due to a force transferred from a manual operation ring to the fixing member of the surface wave motor.

To accomplish the above object, according to the present invention, a surface wave motor built-in lens barrel has a manual focus adjusting mode and an autofocus adjusting mode. The lens barrel comprises a photographing optical system, a fixed drum, a surface wave motor so fitted to the fixed drum as to be rotatable about an optical axis and having a fixed member capable of generating surface waves and a moving member friction-contacting the fixed member, rotating about the optical axis by the surface waves and thereby capable of moving the photographing optical system and a manual operation member capable of moving the photographing optical system by an outside operation. The photographing optical system is, in the manual focus adjusting mode, moved when the moving member and the fixed member of the surface wave motor become integral and rotated interlocking with a manual operation of the manual operation member. The photographing optical system is also, in the autofocus adjusting mode, moved when the fixed member of the surface wave motor is fixed to the fixed lens barrel while the moving member rotates. The fixed member of the surface wave motor has a distortion preventive member for preventing the distortion from being transferred to the portion where the surface waves are produced, the distortion being caused in a portion receiving a transfer of a force from the manual operation member.

Preferably, the lens barrel further has an angle-of-rotation enlarging device, provided on the fixed member of the surface wave motor, for enlarging an angle of rotation of the manual operation member up to an angle of rotation of the fixed member of the surface wave motor. The surface wave motor has a distortion preventive member for preventing the distortion from being transferred to the portion where the surface waves are produced, the distortion being caused in the portion provided with the angle-of-rotation enlarging device.

According to the present invention, the manual operation member is operated by an outside operation in the manual focus adjusting mode. At this time, the force applied on the manual operation member is transferred to the fixed member. The fixed member produces a distortion about the portion receiving the force, and the distortion is transferred to the interior of the fixed member and reaches the distortion preventive member. The distortion preventive member prevents a further transfer of the distortion. As a result, the distortion is prevented from being transferred to the portion where the surface waves of the fixed member are generated.

The above and other objects, features and advantages of the present invention will be explained hereinafter and may be better understood by reference to the drawings and the descriptive matter which follows.

DETAILED DESCRIPTION OF THE PREFERRED EMBODIMENTS

Figure 1:
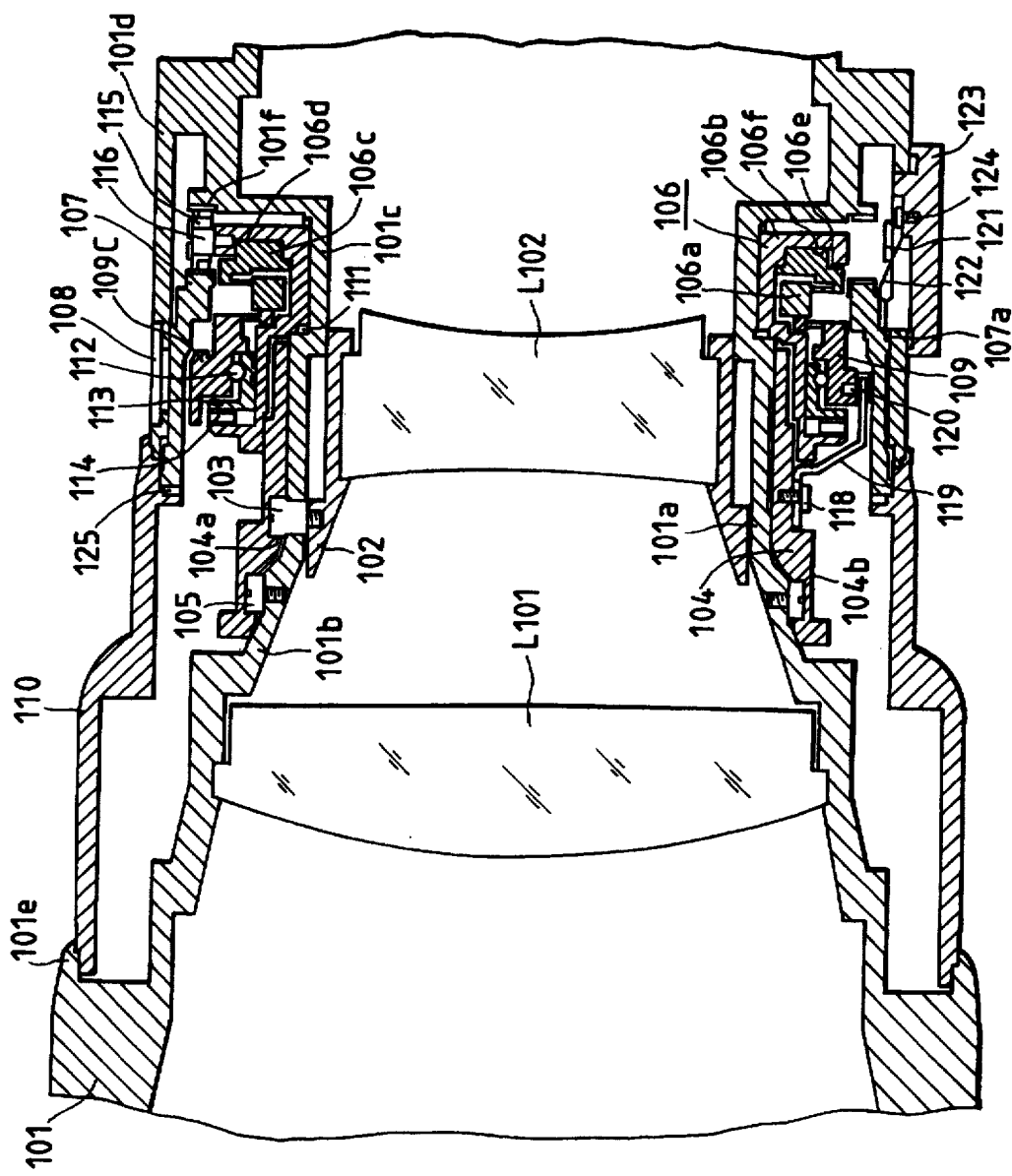
FIG. 1 is a sectional view illustrating a surface wave motor built-in lens barrel according to the present invention.
Figure 2:
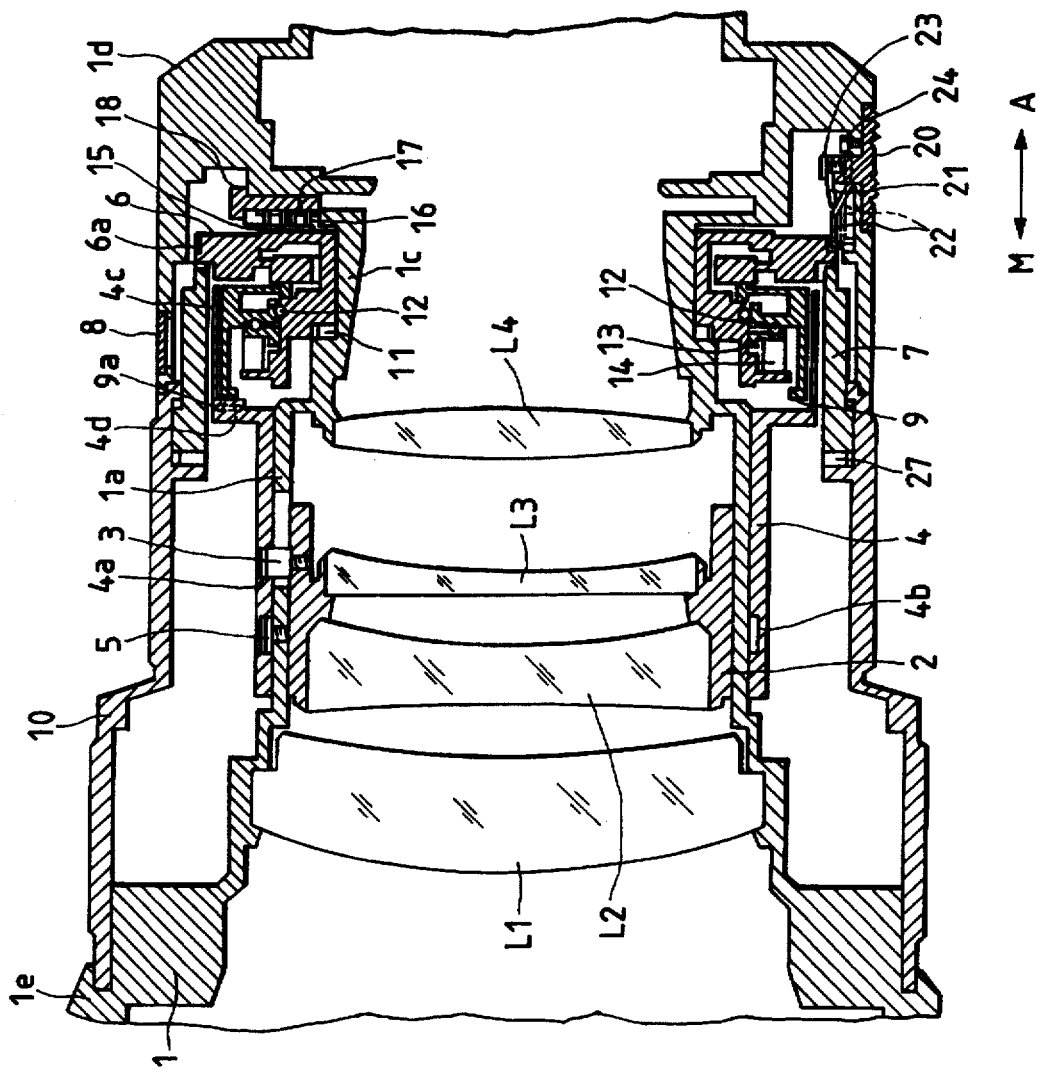
FIG. 2 is a sectional view showing a conventional example of the surface wave motor built-in lens barrel.
Figure 3:
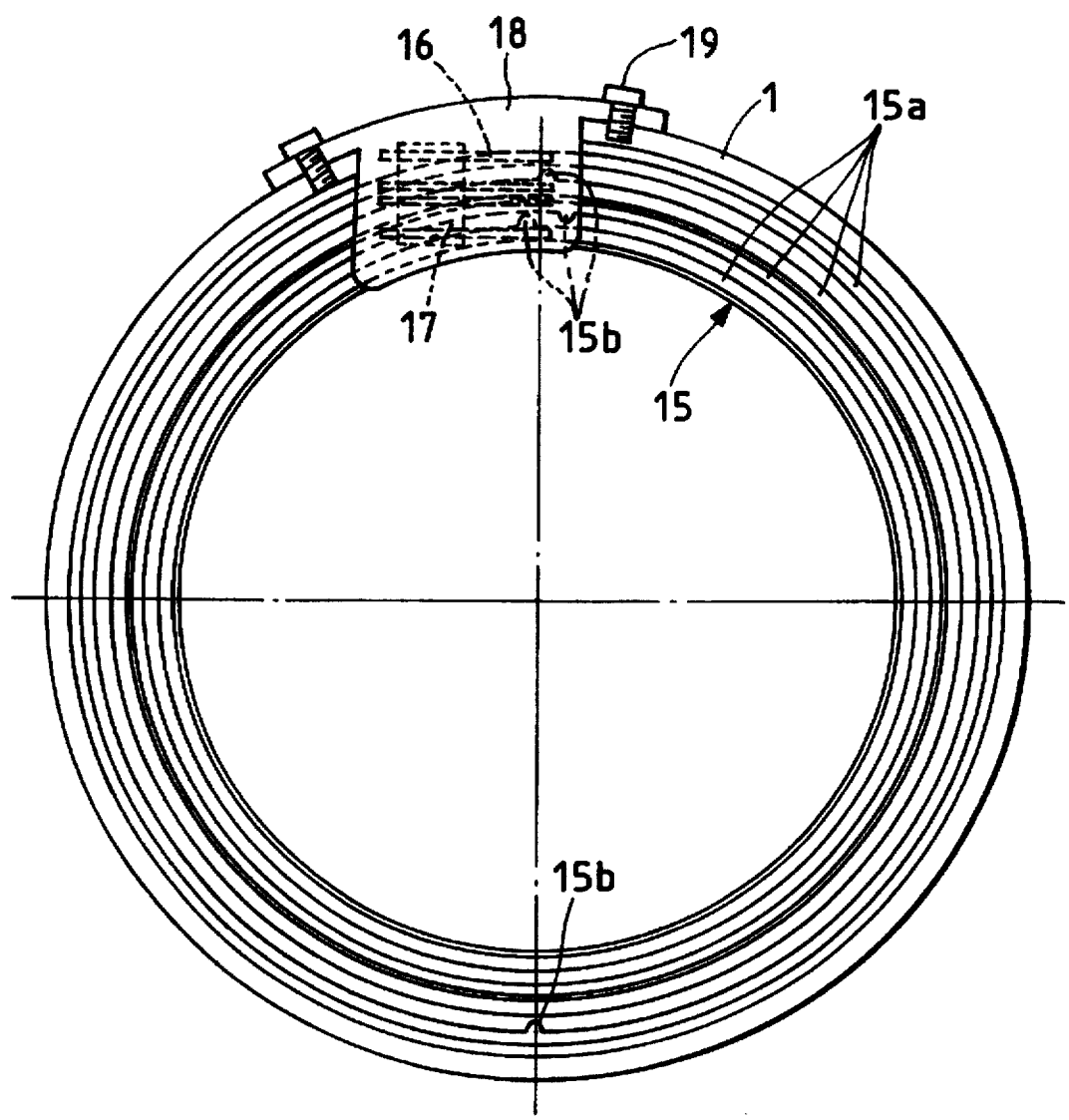
FIG. 3 is a cross-sectional view illustrating a power supply in FIG. 2.
Figure 4:
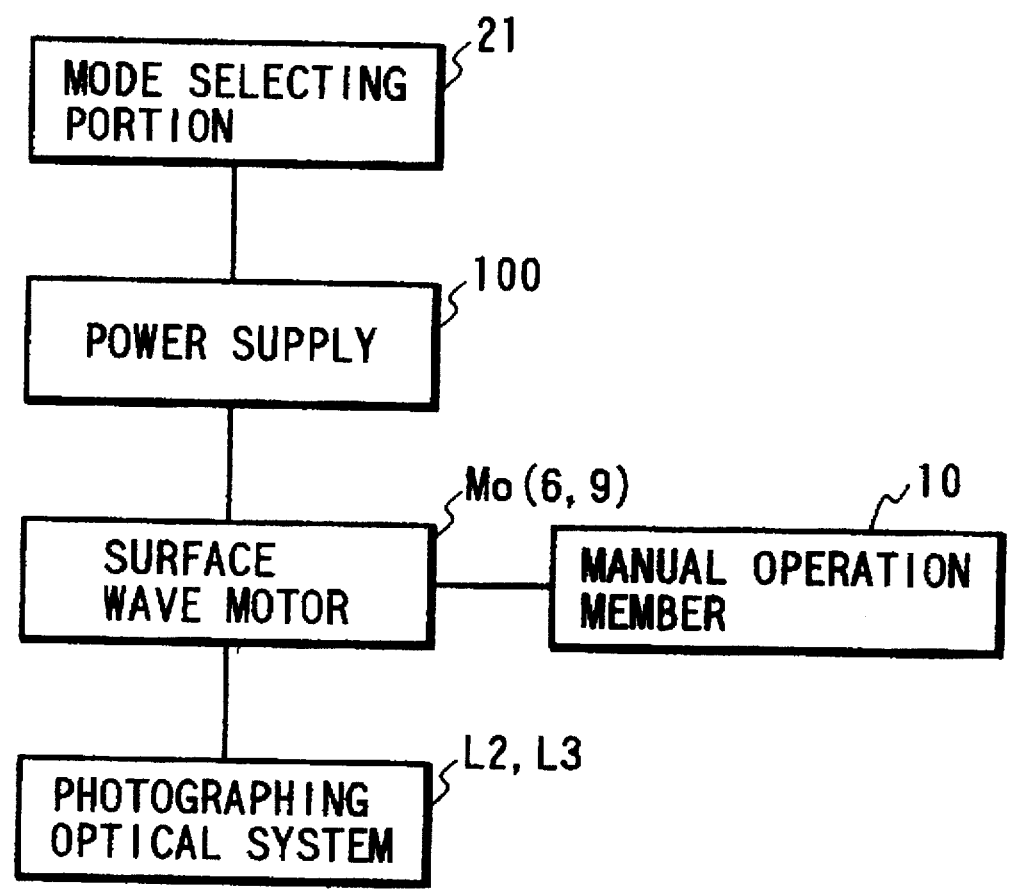
FIG. 4 is a schematic block diagram illustrating a prior art lens barrel.

FIG. 1 is a sectional view illustrating a surface wave motor built-in lens barrel in accordance with an embodiment of the present invention. FIG. 1 shows a state where the lens barrel is in an autofocus adjusting mode wherein a focus adjusting optical system L102 is moved by a rotational force of a surface wave motor.

The focus adjusting optical system L102 is held by a lens holding drum 102 and moves in an optical-axis direction, thus adjusting a focal point. The lens holding drum 102 is fitted to inner peripheries of a central intermediate-diameter portion 101a and of a central small-diameter portion 101c of a fixed drum 101 so that the lens holding drum 102 is movable in the optical-axis direction. A pin 103 is provided on an outer peripheral part of the lens holding drum 102. The pin 103 penetrates a guide groove formed parallel to the optical axis in the central intermediate-diameter portion 101a of the fixed drum 101, and the tip thereof is inserted in a cam groove 104a formed in an inner peripheral surface of a cam ring 104.

The cam ring 104 is fitted to an outer peripheral part of the central intermediate-diameter portion 101a of the fixed drum 101. Further, the cam ring 104 is formed with a circumferential groove 104b formed in the inner peripheral surface of the front edge part thereof. The tip of a pin 105 provided on an outer peripheral part of an oblique surface portion 101b adjacent to the central intermediate-diameter portion 101 is inserted in this circumferential groove 104b. Accordingly, the cam ring 104 is unmovable in the optical-axis direction but rotatable about the optical axis through only a predetermined angle.

A fixing member B-portion 106b is a cylindrical member so fitted to the outer peripheral part of the central small-diameter portion 101c of the fixed drum 101 as to be rotatably about the optical axis. The fixing member B-portion 106b includes a plurality of rollers 115 axially supported on a rotary shaft 116, the rollers 115 being provided on the outer peripheral surface of the rear edge thereof. The roller 115 is a member having such a structure that rubber is covered on the outer periphery of an inner metal ring. Further, the fixing member B-portion 106b has a circumferential groove 106d formed in a front surface of the rear part thereof.

A fixing member A-portion 106a is a member disposed on the outer periphery of the small-diameter portion of the fixing member B-portion 106b. The fixing member A-portion 106a includes an annular protrusion 106c at its rear edge part and held by the fixing member B-portion 106b by inserting the protrusion 106c in the circumferential groove 106d of the fixing member B-portion 106b. Further, the fixing member A-portion 106a receives a biasing force acting backward along the optical axis from a biasing member 114 through a rotator 109, etc., thereby bringing a rear edge surface (a contact surface 106e) of the protrusion 106c into a frictional contact with a bottom surface (a contact surface 106f) of the circumferential groove 106d. The fixing member A-portion 106a and the fixing member B-portion 106b are thereby constructed into substantially one united body in a rotating direction owing to this frictional contact, and these two members in combination perform a function of a fixing member 6 disclosed in Japanese Patent Application No. 6-249224.

A display window 108 is formed in the large-diameter portion 101d of the fixed drum 101 and is composed of a transparent resin. It is possible to read a distance scale displayed on the large-diameter outer peripheral portion 109c of the rotator 109 through the display window 108 and an intermediate ring 107 composed of a transparent synthetic resin.

The rotator 109 is so provided as to be rotatable about a cylinder 113 through bearings 112. Further, an engagement pin 120 is screwed in the large-diameter outer peripheral portion 109c of the rotator 109. On the other hand, an interlocking key 119 is fixed to the middle outer peripheral part of a cam ring 104 with a small screw 118. The interlocking key 119 is biased by an unillustrated biasing member and engages with the engagement pin 120 by this biasing force. Accordingly, the rotator 109 and the cam ring 104 are integral with each other in the rotating direction through the interlocking key and the engagement pin 120 as well. Further, the biasing member 114 applies the optical-axis directional biasing force on the rotator 109 via the bearings 112 as well as via the cylinder 113, thereby bringing the fixing member A-portion 106a and the rotator 109 into the frictional contact with each other.

A manual operator ring 110 fitted to a large-diameter portion 101d and a leftward large-diameter portion 101e of the fixed drum 101 is unmovable in the optical-axis direction but rotatable about the optical axis. The intermediate ring 107 formed of the transparent synthetic resin is rotatably provided along an inner peripheral part of the manual operation ring 110.

A biasing member 111 may be a plate spring, rubber and other resilient members provided between the central small-diameter portion 101c of the fixed drum 101 and the fixing member B-portion 106b. The biasing member 111 presses the fixing member B-portion 106b against an edge surface of a connecting portion 101f between the large-diameter portion 101d and the central small-diameter portion 101c of the fixed drum 101 through the roller 115, thereby generating a predetermined frictional torque so that the fixing member B-portion 106b does not easily rotate in the autofocus adjusting mode.

A biasing member 125 may be a plate spring, rubber and other resilient members provided between the manual operation ring 110 and the intermediate ring 107. The biasing member 125 presses the intermediate ring 107 against the edge surface of the connecting portion 101f between the large-diameter portion 101d and the central small-diameter portion 101c of the fixed drum 101 through the roller 115, thereby making these three members frictional contact with each other. Accordingly, when rotating the manual operation ring 110, a rotational motion thereof is transferred to the fixing member B-portion 106b via the roller 115 and the intermediate ring 107 as well. The fixing member B-portion 106b rotates about the optical axis on the outer periphery of the central small-diameter portion 101c of the fixed drum 101. At this time, a rotational angle of the manual operation ring 110 is twice as large as a rotational angle of the fixing member 106 according to the principle of the planet gear device, and hence the rotational angle enough to make a micro adjustment when in MF. Note that the rotary shaft 116 axially supporting the rollers 115, 115 corresponds to an angle-of-rotation enlarging device of the invention disclosed in Japanese Patent Application No. 6-249224.

The rotator 109 and the fixing member A-portion 106a are biased to the fixing member B-portion 106b by the biasing member 114 and therefore rotate, as described above, integrally with the fixing member B-portion 106b when the fixing member B-portion 106b makes the rotational motion.

Further, if the cam ring 104 rotates through a predetermined angle and stops upon impinging on a restrictor of rotation, and when the manual operation ring 110 is further rotated, the manual operation ring 110 and the intermediate ring 107 slide on an impingement surface of the biasing member 125, thus preventing an excessive torque on areas farther from the intermediate ring 107.

On the other hand, the fixing member B-portion 106b, upon receiving a rotating-directional force from the roller 115 (the rotary shaft 116), elastically deforms about the portion provided with the roller 115 (the rotary shaft 116). This elastic deformation spreads over the entire fixing member B-portion 106b and extends to even the circumferential groove 106d. The elastic deformation is not, however, transferred from the contact surface 106f to the contact surface 106e because of the fixing member A- and B-portions 106a, 106b not being a continuous body in terms of solid mechanics, and an influence thereof is not exerted on even the fixing member A-portion 106a. Accordingly, the fixing member A-portion 106a never gets distorted due to an influence of the force given from the roller 115 (the rotary shaft 116) on the contact surface with the rotator 109.

A spring securing member 123 is a member fixed to the fixed drum 101, wherein a plate spring 122 is fixed to its inner peripheral surface with a small screw 124. The plate spring 122 is a member for inhibiting the rotary motion of the intermediate ring 107 about the optical axis by inserting a front edge part of the plate spring 122 into a plurality of engagement grooves 107a formed in an outer peripheral surface of the rear part of the intermediate ring 107. Further, a changeover plate 121 is a member moving back and forth in the optical-axis direction interlocking with an unillustrated mode changeover switch.

Referring again to FIG. 1, the changeover plate 121 is located backward along the optical axis, and, therefore, the front edge part of the plate spring 122 sinks in the engagement grooves 107a, whereby the manual operation ring 110 is impossible of rotation. When the mode changeover switch (unillustrated) is changed over to a manual focus adjusting mode, the changeover plate 121 moves forward along the optical axis, thereby pushing up the spring 122. As a result, the front edge part of the plate spring 122 disengages from the engagement grooves 107a, with the result that the manual operation ring 110 becomes rotatable.

Next, the operation of the surface wave motor built-in lens barrel in this embodiment will be discussed.

In the autofocus adjusting mode, the plate spring 122 engages with the engagement grooves 107a of the intermediate ring 107, and hence there is a state where both the manual operation ring 110 and the fixing member 106 (the fixing member A- and B-portions 106a, 106b) are impossible of rotation. Hereat, when the electricity is supplied to the surface wave motor, the fixing member A-portion 106a generates surface traveling waves, whereby the rotator 109 rotates in the circumferential direction. The rotational motion of the rotator 109 is transferred to the cam ring 104 through the engagement pin 20 and the interlocking key 119, with the result that the rotator 109 and the cam ring rotate together. As a consequence of this, the lens holding drum 102 moves back and forth in the optical-axis direction in conformity with a configuration of an unillustrated cam groove formed in the cam ring 104, thus automatically adjusting the focal point.

When in the manual focus adjusting mode, the changeover plate 121 moves forward along the optical axis interlocking with the unillustrated mode changeover switch so as to push up the plate spring 122. The plate spring 122 is thereby disengaged from the engagement grooves 107a of the intermediate ring 107. With this disengagement, the manual operation ring 110 becomes rotatable. On the other hand, the supply of the electricity to the surface wave motor is stopped, and the surface wave motor comes into a drive-stopped state. Hereat, the fixing member A- and B-portions 106a, 106b and also the fixing member A-portion 106a and the rotator 109 are strongly pressurized each other by the biasing member 114. Consequently, there can be satisfied such a condition as C<A1 (C<A2), where A1 is a frictional torque (a frictional torque A2 between the fixing member A- and B-portions 106a, 106b) between the fixing member A-portion 106a and the rotator 109, and C is a torque needed for driving the lens holding drum 102. Accordingly, when rotting the manual operation ring 110, the fixing member A- and B-portions 106a, 106b and the rotator 109 rotate through the intermediate ring 107. When the rotator 109 rotates, the cam ring 104 rotates integrally as in the autofocus adjusting mode, and the lens holding drum 102 moves along the optical axis, thus performing the manual focus adjustment.

As discussed above, in accordance with this embodiment, the fixing member 106 constructed so that the fixing member 106 is separated into the fixing member A-portion 106a and the fixing member B-portion 106b brought into the frictional contact with the contact surfaces 106e, 106f. Based on this construction, if the fixing member B-portion 106b is elastically deformed by receiving the force from the roller 115, the deformation thereof extends up to the contact surface 106f but is never transferred further to the contact surface 106e from the contact surface 106f enough to make even the fixing member A-portion 106a deform. That is, the contact surfaces 106e, 106f function as a distortion preventive member for preventing the distortion of the fixing member B-portion 106b from being transferring to the fixing member A-portion 106a. Accordingly, the fixing member A-portion 106a never has an unexpected deformation on the contact surface with the rotator 109. As a result, the lens barrel in this embodiment is capable of keeping an electromechanical energy conversion efficiency of the surface wave motor in a good state at all times.

(Other Embodiments)

Note that the present invention is not confined to the embodiments discussed above. The above-described embodiments have been exemplified, and there can be carried out any kind of embodiments having substantially the same technical concept in construction as that claimed in the claims of the present invention and exhibiting the same operation as well without departing from the technical scope of the present invention.

In accordance with the embodiments discussed above, the fixing member 106 and the fixing member B-portion 106b are brought into the frictional contact with the contact surfaces 106e, 106f by the biasing force of the biasing member 114 and thereby connected. Those members may be, however, connected otherwise on condition that the rotating-directional motion of the fixing member B-portion 106b is properly transferred to the fixing member A-portion 106a and that the distortion caused in the fixing member B-portion 106b is cut off in the connecting portion therebetween. Hence, this connecting method may be contrived so that the two members are formed into one united body by use of bonding agent, etc. having a relatively weak binding force. Further, there may be increased an effect of cutting off the distortion by such an arrangement that a member different in elastic coefficient or the like from the above two members is interposed therebetween.

Moreover, the embodiments discussed above have dealt with the arrangement that the improvement relative to this invention is added to the lens barrel having the same construction as the lens barrel disclosed in Japanese Patent Application No. 6-249224, i.e., the lens barrel including the angle-of-rotation enlarging device. The improvement relative to the present invention may be, however, added to the lens barrel including no angle-of-rotation enlarging device but having the same construction as the lens barrel exemplified in the prior art example of the present application.

Therefore, it is intended that the invention not be limited to the preferred embodiments described herein, but that the invention will include all embodiments falling within the scope of the appended claims.

What is claimed is:

1. A surface wave motor built-in lens barrel having a manual focus adjusting mode and an autofocus adjusting mode, said lens barrel comprising:

a photographing optical system;

a fixed drum;

a surface wave motor so fitted to said fixed drum as to be rotatable about an optical axis and having a fixed member capable of generating surface waves and a moving member friction-contacting said fixed member, rotating about the optical axis by the surface waves and thereby capable of moving said photographing optical system; and a manual operation member capable of moving said photographing optical system by an outside operation, wherein said photographing optical system is, in the manual focus adjusting mode, moved when said moving member and said fixed member of said surface wave motor become integral and rotated interlocking with a manual operation of said manual operation member and is also, in the autofocus adjusting mode, moved when said fixed member of said surface wave motor is fixed to said fixed lens barrel while said moving member rotates, and said fixed member of said surface wave motor has a distortion preventive member for preventing distortion from being transferred to the portion where the surface waves are produced, the distortion being caused in a portion receiving a transfer of a force from said manual operation member.

2. The lens barrel according to claim 1, further comprising an angle-of-rotation enlarging device, provided on said fixed member of said surface wave motor, for enlarging an angle of rotation of said manual operation member up to an angle of rotation of said fixed member of said surface wave motor, wherein said surface wave motor has a distortion preventive member for preventing the distortion from being transferred to the portion where the surface waves are produced, the distortion being caused in the portion provided with said angle-of-rotation enlarging device.

* * * * *